US010242800B2

(12) United States Patent
Sakate et al.

(10) Patent No.: US 10,242,800 B2
(45) Date of Patent: Mar. 26, 2019

(54) MULTILAYER CERAMIC CAPACITOR HAVING MANGANESE CONCENTRATION GRADIENT IN THICKNESS DIRECTION

(71) Applicant: TAIYO YUDEN CO., LTD., Taito-ku, Tokyo (JP)

(72) Inventors: Daisuke Sakate, Takasaki (JP); Sadanori Shimoda, Takasaki (JP); Fumi Taniguchi, Takasaki (JP); Minoru Ryu, Takasaki (JP)

(73) Assignee: TAIYO YUDEN CO., LTD, Tokyo (JP)

( * ) Notice: Subject to any disclaimer, the term of this patent is extended or adjusted under 35 U.S.C. 154(b) by 0 days.

(21) Appl. No.: 15/600,615

(22) Filed: May 19, 2017

(65) Prior Publication Data
US 2017/0345567 A1 Nov. 30, 2017

(30) Foreign Application Priority Data

May 26, 2016 (JP) .................. 2016-105366

(51) Int. Cl.
| H01G 4/12 | (2006.01) |
| H01G 4/005 | (2006.01) |
| H01G 4/30 | (2006.01) |
| H01G 4/10 | (2006.01) |
| H01M 4/46 | (2006.01) |

(52) U.S. Cl.
CPC ........... H01G 4/1218 (2013.01); H01G 4/005 (2013.01); H01G 4/10 (2013.01); H01G 4/30 (2013.01); *H01M 4/463* (2013.01); *H01M 4/466* (2013.01)

(58) Field of Classification Search
CPC ........ H01G 4/1218; H01G 4/10; H01G 4/005; H01G 4/30
See application file for complete search history.

(56) References Cited

U.S. PATENT DOCUMENTS

| 2004/0090721 A1* | 5/2004 | Nagai ............... H01C 1/14 361/15 |
| 2006/0043523 A1* | 3/2006 | Ito .................. H01G 4/08 257/510 |
| 2014/0211367 A1* | 7/2014 | Morita ............. H01G 4/1209 361/301.4 |
| 2015/0030830 A1* | 1/2015 | Adachi ............. H01B 3/12 428/212 |

(Continued)

FOREIGN PATENT DOCUMENTS

JP 2013197492 A 9/2013

*Primary Examiner* — David M Sinclair
(74) *Attorney, Agent, or Firm* — Law Office of Katsuhiro Arai

(57) ABSTRACT

In an embodiment, a multilayer ceramic capacitor 10 has a capacitor body comprising a capacitive part 11a constituted by multiple internal electrode layers 11a1 that are stacked with dielectric layers 11a2 in between, as well as dielectric cover parts 11b that respectively cover both sides of the capacitive part 11a in the stacking direction. Also, the dielectric layers 11a2 of the capacitive part 11a, and the dielectric cover parts 11b, contain elemental manganese, and the elemental manganese is distributed in such a way that its quantity gradually decreases in the depth direction from the exterior faces of the dielectric cover parts 11b toward the center of the dielectric layers 11a2 of the capacitive part 11a.

2 Claims, 3 Drawing Sheets

(56) References Cited

U.S. PATENT DOCUMENTS

| | | | | |
|---|---|---|---|---|
| 2015/0049413 A1* | 2/2015 | Wada | ................ | H01G 4/12 361/301.4 |
| 2015/0279564 A1* | 10/2015 | Naito | ................ | H01G 4/30 361/301.4 |
| 2016/0005543 A1* | 1/2016 | Wada | ................ | H01G 4/30 361/301.4 |
| 2016/0111213 A1* | 4/2016 | Okamoto | ................ | B32B 18/00 361/301.4 |

\* cited by examiner

FIG. 1A
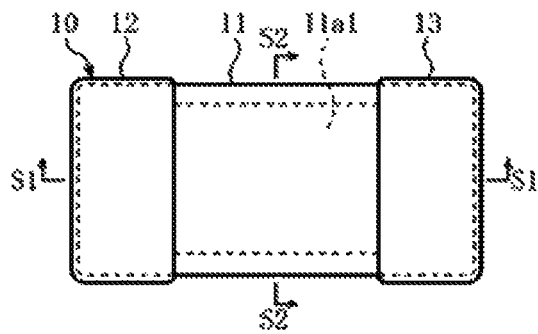
FIG. 1B
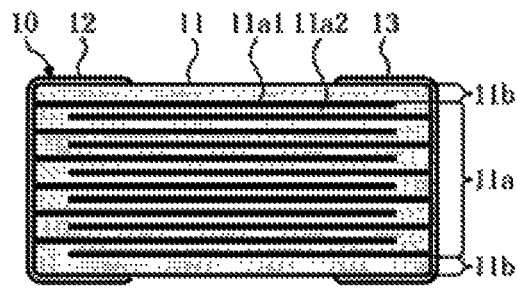
FIG. 1C
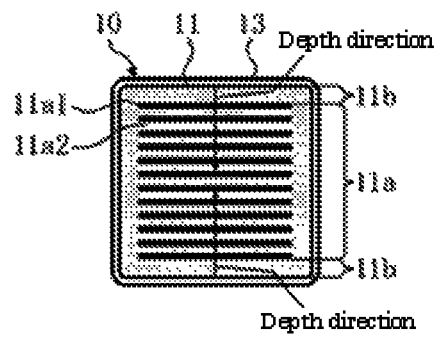
FIG. 2
| | Slurry Compositions | $BaTiO_3$ | $MnO$ | $Al_2O_3$ | $Ho_2O_3$ | $SiO_2$ |
|---|---|---|---|---|---|---|
| Example | Dielectric cover part | 100mol | 1.0mol | ———— | 0.5mol | 1.0mol |
| | Dielectric layer | 100mol | 0.5mol | 0.01mol | 0.5mol | 1.0mol |
| Comparative example | Dielectric cover part | 100mol | 1.0mol | ———— | 0.5mol | 1.0mol |
| | Dielectric layer | 100mol | 0.5mol | ———— | 0.5mol | 1.0mol |

MULTILAYER CERAMIC CAPACITOR HAVING MANGANESE CONCENTRATION GRADIENT IN THICKNESS DIRECTION

BACKGROUND

Field of the Invention

The present invention relates to a multilayer ceramic capacitor having a capacitor body comprising a capacitive part constituted by multiple internal electrode layers that are stacked with dielectric layers in between, as well as dielectric cover parts that respectively cover both sides of the capacitive part in the stacking direction.

Description of the Related Art

A multilayer ceramic capacitor generally has a capacitor body of roughly rectangular solid shape, and external electrodes that are respectively provided on the opposing ends of the capacitor body. The capacitor body has a capacitive part constituted by multiple internal electrode layers that are stacked with dielectric layers in between, as well as dielectric cover parts that respectively cover both sides of the capacitive part in the stacking direction, where the ends of the multiple internal electrode layers are alternately connected to the external electrodes.

By the way, including elemental manganese in the dielectric layers of the capacitive part, and the dielectric cover parts, of the capacitor body, to improve longevity (longevity under high-temperature load) of the multilayer ceramic capacitor is known in the art (refer to Patent Literature 1, for example). However, it is said that, because including elemental manganese in the dielectric layers of the capacitive part would cause the specific dielectric constant of the dielectric layers to drop, preferably the content of elemental manganese in the dielectric layers of the capacitive part is set lower than the content of elemental manganese in the dielectric cover parts.

However, setting the content of elemental manganese in the dielectric layers of the capacitive part lower than the content of elemental manganese in the dielectric cover parts would raise different concerns, such as cracks and separations occurring at the boundaries of the capacitive part and the dielectric cover parts due to different ratios at which the two sides shrink in the sintering process implemented to obtain the capacitor body, thereby causing the insulation resistance of the multilayer ceramic capacitor to drop.

BACKGROUND ART LITERATURES

[Patent Literature 1] Japanese Patent Laid-open No. 2013-197492

SUMMARY

An object of the present invention is to provide a multilayer ceramic capacitor that can prevent its insulation resistance from dropping, even when the content of elemental manganese in the dielectric layers of the capacitive part is lower than the content of elemental manganese in the dielectric cover parts.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor pertaining to the present invention represents a multilayer ceramic capacitor having a capacitor body comprising a capacitive part constituted by multiple internal electrode layers that are stacked with dielectric layers in between, as well as dielectric cover parts that respectively cover both sides of the capacitive part in the stacking direction, wherein the dielectric layers of the capacitive part, and the dielectric cover parts, contain elemental manganese, and the elemental manganese is distributed in such a way that its quantity gradually decreases in the depth direction from the exterior faces of the dielectric cover parts toward the dielectric layers of the capacitive part.

According to the multilayer ceramic capacitor pertaining to the present invention, drop in its insulation resistance can be prevented, even when the content of elemental manganese in the dielectric layers of the capacitive part is lower than the content of elemental manganese in the dielectric cover parts.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1A is a plan view of a multilayer ceramic capacitor to which the present invention is applied, FIG. 1B is a cross sectional view of FIG. 1A along line S1-S1, and FIG. 1C is a cross sectional view of FIG. 1A along line S2-S2.

FIG. 2 is a table showing the compositions of the slurries for dielectric cover parts, and compositions of the slurries for dielectric layers of the capacitive part, which were used to manufacture the example and the comparative example.

FIG. 3A is a graph showing the distribution of elemental manganese quantities in the example, while

DESCRIPTION OF THE SYMBOLS

Figure 3A:
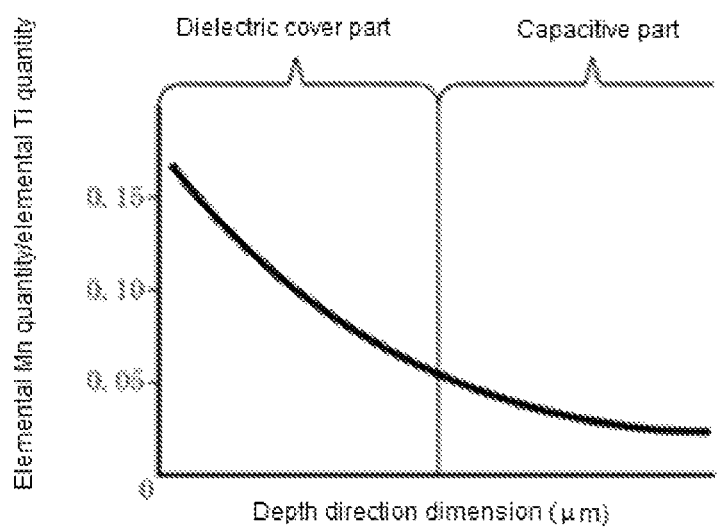

10—Multilayer ceramic capacitor, 11—Capacitor body, 11a—Capacitive part, 11a1—Internal electrode layer, 11a2—Dielectric layer, 11b—Dielectric cover part, 12, 12-1, 12-2—First external electrode, 13, 13-1, 13-2—Second external electrode

DETAILED DESCRIPTION OF EMBODIMENTS

First, the basic constitution of a multilayer ceramic capacitor 10 to which the present invention is applied, is explained using FIGS. 1A to 1C. In the following explanation, the lateral direction in FIG. 1A is denoted as "length direction," the vertical direction in FIG. 1A is denoted as "width direction," and the vertical direction in FIG. 1B is denoted as "height direction," while the dimensions along these directions are denoted as "length," "width," and "height," respectively.

The multilayer ceramic capacitor 10 has a capacitor body 11 of roughly rectangular solid shape, a first external electrode 12 provided on one length-direction end of the capacitor body 11, and a second external electrode 13 provided on the other length-direction end of the capacitor body 11.

The capacitor body 11 has a capacitive part 11a constituted by multiple internal electrode layers 11a1 that are stacked with dielectric layers 11a2 in between, as well as dielectric cover parts 11b that respectively cover both sides of the capacitive part 11a in the height direction. The multiple internal electrode layers 11a1 have roughly the same rectangular profile and roughly the same thickness, and their ends are connected alternately to the first external electrode 12 and second external electrode 13. It should be noted that, while a total of 12 internal electrode layers 11a1 are depicted in FIGS. 1A to 1C for the sake of illustration, the number of internal electrode layers 11a1 is not limited in any way.

The primary component of the capacitor body 11 except for the internal electrode layers 11a1, or specifically the primary component of the dielectric layers 11a2 of the capacitive part 11a as well as the dielectric cover parts 11b, is barium titanate, strontium titanate, calcium titanate, magnesium titanate, calcium zirconate, calcium zirconate titanate, barium zirconate, titanium oxide, or other dielectric material (dielectric ceramic material). On the other hand, the primary component of the internal electrode layers 11a1 of the capacitive part 11a is nickel, copper, palladium, platinum, silver, gold, or any alloy thereof, or other metal material. Also, the primary component of the first external electrode 12 as well as the second external electrode 13 is nickel, copper, palladium, platinum, silver, gold, or any alloy thereof, or other metal material.

Also, the dielectric layers 11a2 of the capacitive part 11a, and the dielectric cover parts 11b, contain elemental manganese, and this elemental manganese is distributed in such a way that its quantity gradually decreases in the depth direction (refer to FIG. 1C) from the exterior faces of the dielectric cover parts 11b toward the center of the dielectric layers 11a2 of the capacitive part 11a (refer to FIG. 3A).

Figure 3B:
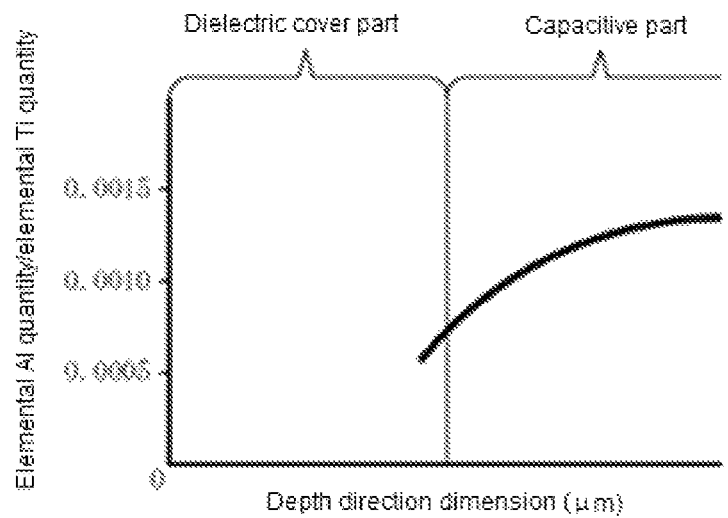
FIG. 3B is a graph showing the distribution of elemental aluminum quantities in the example.

Furthermore, the dielectric layers 11a2 of the capacitive part 11a contain elemental aluminum, and this elemental aluminum is distributed in such a way that its quantity gradually increases in the depth direction (refer to FIG. 1C) from the exterior faces of the dielectric cover parts 11b toward the center of the dielectric layers 11a2 of the capacitive part 11a (refer to FIG. 3B).

In this disclosure, the term "gradually increasing (or decreasing)" refers to continuously increasing (or decreasing), increasing (or decreasing) at a certain (determinable) rate, continuously increasing (or decreasing) when a regression equation is drawn using data points, or increasing (or decreasing) as if data points are plotted along a curved line or approximately straight line, or continuously increasing (or decreasing) when smoothing the data, depending on the composition, the manufacturing process, etc. according to embodiments.

Next, the specific constitution of the multilayer ceramic capacitor 10 is explained using FIG. 2, together with its manufacturing method, etc., using an example where the primary component of the dielectric layers 11a2 of the capacitive part 11a as well as the dielectric cover parts 11b is barium titanate, the primary component of the internal electrode layers 11a1 is nickel, and the primary component of the first external electrode 12 as well as the second external electrode 13 is nickel. It should be noted that the term "example" in this explanation indicates a multilayer ceramic capacitor corresponding to the aforementioned multilayer ceramic capacitor 10, while the term "comparative example" indicates a multilayer ceramic capacitor not corresponding to the aforementioned multilayer ceramic capacitor 10.

The example and comparative example have a size of 600 μm in length, 300 μm in width, and 300 μm in height, and they each have a total of 100 internal electrode layers 11a1 of 1 μm in thickness, as well as dielectric layers 11a2 of 1 μm in thickness, and dielectric cover parts 11b of 50 μm in thickness. Also, the primary component of the dielectric layers 11a2 as well as the dielectric cover parts 11b is barium titanate, the primary component of the internal electrode layers 11a1 is nickel, and the primary component of the first external electrode 12 as well as the second external electrode 13 is nickel.

To manufacture the example, first a ceramic slurry for dielectric layers, and a ceramic slurry for dielectric cover parts, both containing barium titanate powder, organic solvent, organic binder, and if necessary, dispersant and other additives, are prepared.

The ceramic slurry for dielectric layers contains elemental manganese (Mn) by an equivalent of 0.5 mol of manganese oxide (II) (MnO), elemental aluminum (Al) by an equivalent of 0.01 mol of aluminum oxide ($Al_2O_3$), elemental holmium (Ho) by an equivalent of 0.5 mol of holmium oxide ($Ho_2O_3$), and elemental silicon (Si) by an equivalent of 1.0 mol of silicon dioxide ($SiO_2$), per 100 mol of barium titanate ($BaTiO_3$), as shown in the "Example" fields of FIG. 2.

On the other hand, the ceramic slurry for dielectric cover parts contains elemental manganese (Mn) by an equivalent of 1.0 mol of manganese oxide (II) (MnO), elemental holmium (Ho) by an equivalent of 0.5 mol of holmium oxide ($Ho_2O_3$), and elemental silicon (Si) by an equivalent of 1.0 mol of silicon dioxide ($SiO_2$), per 100 mol of barium titanate ($BaTiO_3$), as shown in the "Example" fields of FIG. 2. In other words, the ceramic slurry for dielectric cover parts contains no elemental aluminum (Al), and contains more elemental manganese (Mn), compared to the ceramic slurry for dielectric layers.

Also, a paste containing nickel powder, organic solvent, organic binder, and, if necessary, dispersant and other additives, is prepared as an internal electrode layer paste. Furthermore, a paste containing nickel powder, organic solvent, organic binder, and if necessary, dispersant and other additives, is prepared as an external electrode paste.

Next, the ceramic slurry for dielectric layers is coated on the surface of a carrier film, and then dried, to produce a first sheet. Also, the internal electrode layer paste is printed on the surface of this first sheet, and then dried, to produce a second sheet on which internal electrode layer patterns have been formed. Furthermore, the ceramic slurry for dielectric cover parts is coated on the surface of a carrier film, and then dried, to produce a third sheet.

Next, a specified number of unit sheets taken from the third sheet are stacked and thermally compressed one by one, to form an area corresponding to one dielectric cover part 11b. Next, a specified number of unit sheets (that include internal electrode layer patterns) taken from the second sheet are stacked and thermally compressed one by one, to form an area corresponding to the capacitive part 11a. Next, a specified number of unit sheets taken from the third sheet are stacked and thermally compressed one by one, to form an area corresponding to the other dielectric cover part 11b. Lastly, the entire stack of sheets is thermally compressed for one last time, to produce an unsintered multilayer sheet.

Next, the unsintered multilayer sheet is cut to a grid, to produce unsintered capacitor bodies, each corresponding to the capacitor body 11. Next, the external electrode paste is applied on both length-direction ends of the unsintered capacitor bodies by means of dip coating, roller coating, etc., and then dried, to produce unsintered external electrodes. Next, many such unsintered capacitor bodies having unsintered external electrodes are put in a sintering furnace and sintered (this process includes binder removal and sintering) all at once in a reducing atmosphere and according to a temperature profile appropriate for barium titanate and nickel.

It should be noted that the comparative example is different from the example in the composition of the ceramic slurry for dielectric layers used when it is manufactured. To be specific, the ceramic slurry for dielectric layers used when the comparative example was manufactured contains no elemental aluminum (Al), compared to the ceramic slurry for dielectric layers used when the example was manufactured, as shown in the "Comparative Example" fields of FIG. 2. On the other hand, the composition of the ceramic slurry for dielectric cover parts used when the comparative example was manufactured, is the same as the composition of the ceramic slurry for dielectric cover parts used when the example was manufactured. Also, the manufacturing method of the comparative example is the same as the aforementioned manufacturing method of the example.

Next, the method used to collect data for the purpose of drawing the distribution of elemental manganese quantities shown in FIG. 3A, and the distribution of elemental aluminum quantities shown in FIG. 3B, is explained.

Data was collected using a laser abrasion system (NWR213, manufactured by ESI) and a mass spectrometer (7900 ICP-MS, manufactured by Agilent Technologies).

To collect data, a spot at the measuring target location in the cross section of the example corresponding to FIG. 1C was irradiated for 30 seconds with a laser beam of 14 J/cm$^2$ in irradiation energy and 10 Hz in frequency emitted from the laser abrasion system. Then, the aerosol generated by the spot irradiation was introduced, using helium gas, into the inductively coupled plasma chamber of the mass spectrometer.

Next, in the mass spectrometer, the aerosol introduced into the inductively coupled plasma chamber was plasma-excited at a RF power of 1550 W, and turned into positive ions. Then, the positive ions, especially the element ions having the mass-to-charge ratios of interest, are introduced into a quadrupole mass spectrometer. And, in the quadrupole mass spectrometer, the introduced elements were counted in a relative manner by conducting time analysis.

Next, the aforementioned measurement procedure was performed in the same manner at other measuring target locations in the cross section of the sample corresponding to FIG. 1C, or specifically the procedure was performed successively in the depth direction (refer to FIG. 1C) from the exterior faces of the dielectric cover parts 11b toward the center of the dielectric layers 11a2 of the capacitive part 11a of the example, to collect the necessary data.

While the vertical axis is labeled as "elemental Mn quantity/elemental Ti quantity" in FIG. 3A, the elemental titanium quantity is the same in the dielectric cover parts 11b and also in the dielectric layers 11a2 of the capacitive part 11a (refer to the "Example" fields of FIG. 2), and therefore this FIG. 3A is understood as presenting a distribution of gradually decreasing elemental manganese quantities in the depth direction from the exterior faces of the dielectric cover parts 11b toward the center of the dielectric layers 11a2 of the capacitive part 11a.

Additionally, while the vertical axis is labeled as "elemental Al quantity/elemental Ti quantity" in FIG. 3B, similarly the elemental titanium quantity is the same in the dielectric cover parts 11b and also in the dielectric layers 11a2 of the capacitive part 11a (refer to the "Example" fields of FIG. 2), and therefore this FIG. 3B is understood as presenting a distribution of gradually increasing elemental aluminum quantities in the depth direction from the exterior faces of the dielectric cover parts 11b toward the center of the dielectric layers 11a2 of the capacitive part 11a. It should be noted that the presence of elemental aluminum in some areas of the dielectric cover parts 11b in FIG. 3B is probably explained by diffusion.

Next, the method of the verification conducted to check whether or not the aforementioned multilayer ceramic capacitor 10 can prevent its insulation resistance from dropping, and the result of the verification, are explained.

The verification was conducted by conducting a wet-load test on 100 example units and 100 comparative example units. To be specific, 10 V of direct voltage was applied for 100 hours in an ambience of 85° C. in temperature and 85% in humidity, after which the number of units whose insulation resistance reached 1 MΩ were checked.

According to the check results, the insulation resistance reached 1 MΩ in none of the 100 example units, while the insulation resistance reached 1 MΩ in 10 of the 100 comparative example units. In essence, drop in insulation resistance was verified to have been prevented in the example corresponding to the aforementioned multilayer ceramic capacitor 10, compared to the comparative example not corresponding to the multilayer ceramic capacitor 10. In other words, the example was verified to have almost no cracks or separations that would cause drop in insulation resistance, in the capacitor body 11, especially at the boundaries of the capacitive part 11a and the dielectric cover parts 11b.

Next, the effects achieved by the multilayer ceramic capacitor 10 are explained in consideration of the element quantity distributions shown in FIGS. 3A and 3B as well as the verification results presented above.

With the multilayer ceramic capacitor 10, although the dielectric layers 11a2 of the capacitive part 11a, and the dielectric cover parts 11b, contain elemental manganese, this elemental manganese is distributed in such a way that its quantity gradually decreases in the depth direction (refer to FIG. 1C) from the exterior faces of the dielectric cover parts 11b toward the center of the dielectric layers 11a2 of the capacitive part 11a, as shown in FIG. 3A. That is to say, probably this distribution of elemental manganese quantities explains why cracks and separations that would cause drop in insulation resistance, barely exist inside the capacitor body 11, especially at the boundaries of the capacitive part 11a and the dielectric cover parts 11b. This means that, by adopting the distribution of elemental manganese quantities shown in FIG. 3A, drop in the insulation resistance of the multilayer ceramic capacitor 10 due to the aforementioned cracks and separations can be prevented in a reliable manner, even when the content of elemental manganese in the dielectric layers 11a2 of the capacitive part 11a is set lower than the content of elemental manganese in the dielectric cover parts 11b.

With the multilayer ceramic capacitor 10, the dielectric layers 11a2 of the capacitive part 11a contain elemental aluminum, and this elemental aluminum is distributed in such a way that its quantity gradually increases in the depth direction (refer to FIG. 1C) from the exterior faces of the dielectric cover parts 11b toward the center of the dielectric layers 11a2 of the capacitive part 11a, as shown in FIG. 3B. That is to say, probably this distribution of elemental aluminum quantities is preventing the elemental manganese contained in the dielectric cover parts 11b from diffusing to the dielectric layers 11a2 of the capacitive part 11a, thereby contributing to the achievement of the distribution of elemental manganese quantities shown in FIG. 3A. This means that, by adopting the distribution of elemental aluminum quantities shown in FIG. 3B, drop in the insulation resistance of the multilayer ceramic capacitor 10 due to the aforementioned cracks and separations can be prevented in a more reliable manner because the distribution of elemental manganese quantities shown in FIG. 3A is achieved more accurately.

Other Embodiments

Figure 4A:
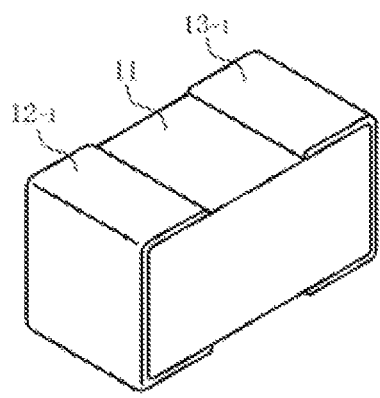
FIGS. 4A and 4B are each a drawing illustrating a different example of the shapes of the first external electrode and second external electrode shown in FIGS. 1A to 1C.

The first external electrode 12 and second external electrode 13 shown in FIGS. 1A to 1C can have the shapes shown in FIG. 4A, respectively. To be specific, a first external electrode 12-1 shown in FIG. 4A continuously has a part that covers one length-direction end of the capacitor body 11 and parts that partially cover both height-direction faces of the capacitor body 11, while a second external electrode 13-1 continuously has a part that covers the other length-direction end of the capacitor body 11 and parts that partially cover both height-direction faces of the capacitor body 11. Also, the first external electrode 12 and second external electrode 13 shown in FIGS. 1A to 1C can have the shapes shown in FIG. 4B, respectively. To be specific, a first external electrode 12-2 shown in FIG. 4B continuously has a part that covers one length-direction end of the capacitor body 11 and a part that partially covers one height-direction face of the capacitor body 11, while a second external electrode 13-2 continuously has a part that covers the other length-direction end of the capacitor body 11 and a part that partially covers one height-direction face of the capacitor body 11. In other words, effects similar to those described above can still be achieved with the external electrode shapes shown in FIG. 4A or the external electrode shapes shown in FIG. 4B.

Figure 4B:
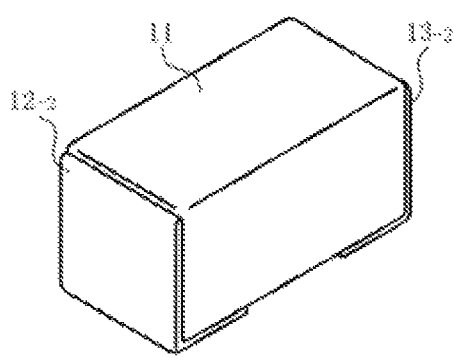

Also, the first external electrode 12 and second external electrode 13 shown in FIGS. 1A to 1C, including the first external electrode 12-1 and second external electrode 13-1, as well as the first external electrode 12-2 and second external electrode 13-2, as shown in FIGS. 4A and 4B, need not have a single-layer structure. In other words, effects similar to those described above can still be achieved with a multi-layer structure where one or more separate metal film(s), such as a plating film(s), is/are formed on the surface of the first external electrode and that of the second external electrode.

Furthermore, while the explanation using FIGS. 1A to 1C did not clearly indicate the relationship or dimension values of the length, width, and height of the multilayer ceramic capacitor 10, these length, width, and height can have a relationship of "length>width=height," or it can have a relationship of "length>width>height," "length>height>width," "width>length=height," "width>length>height," or "width>height>length," and the dimension values of the length, width, and height are not limited in any way. In other words, effects similar to those described above can still be achieved regardless of the relationship or dimension values of the length, width, and height of the multilayer ceramic capacitor.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-105366, filed May 26, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor having a capacitor body, comprising:
    a capacitive part constituted by multiple internal electrode layers that are stacked with dielectric layers in between, as well as dielectric cover parts that respectively cover both sides of the capacitive part in a stacking direction;
    wherein the dielectric layers of the capacitive part, and the dielectric cover parts, contain elemental manganese, and the elemental manganese is distributed in an entire portion of each dielectric layer of the capacitive part and in an entire portion of the cover parts in such a way that its quantity decreases in a depth direction from exterior faces of the dielectric cover parts toward the center of the dielectric layers of the capacitive part,
    wherein the dielectric layers of the capacitive part contain elemental aluminum, and the elemental aluminum is distributed in an entire portion of each dielectric layer of the capacitive part in such a way that its quantity increases in a depth direction from exterior faces of the dielectric cover parts toward the center of the dielectric layers of the capacitive part.

2. A multilayer ceramic capacitor having a capacitor body, comprising:
    a capacitive part constituted by multiple internal electrode layers that are stacked with dielectric layers in between, as well as dielectric cover parts that respectively cover both sides of the capacitive part in a stacking direction;

wherein the dielectric layers of the capacitive part, and the dielectric cover parts, contain elemental titanium and elemental manganese, and a ratio of a quantity of the elemental manganese and a quantity of the elemental titanium, expressed by "Elemental manganese quantity/Elemental titanium quantity," is distributed in an entire portion of each dielectric layer of the capacitive part and in an entire portion of the cover parts in a manner decreasing in a depth direction from exterior faces of the dielectric cover parts toward the center of the dielectric layers of the capacitive part, wherein the dielectric layers of the capacitive part contain elemental aluminum, and a ratio of a quantity of the elemental aluminum and a quantity of the elemental titanium, expressed by "Elemental aluminum quantity/Elemental titanium quantity," is distributed in an entire portion of each dielectric layer of the capacitive part in a manner increasing in a depth direction from exterior faces of the dielectric cover parts toward the center of the dielectric layers of the capacitive part.

* * * * *